United States Patent [19]

Lang

[11] 4,238,234
[45] Dec. 9, 1980

[54] PRINTING INKS CONTAINING A POLYETHER AMINE FIXING AGENT

[75] Inventor: Theodor Lang, Basel, Switzerland

[73] Assignee: Sandoz Ltd., Basel, Switzerland

[21] Appl. No.: 79,452

[22] Filed: Sep. 27, 1979

[30] Foreign Application Priority Data

Oct. 3, 1978 [CH] Switzerland ............... 10252/78

[51] Int. Cl.³ ..................................... C09D 11/10
[52] U.S. Cl. ...................................... 106/22; 106/23; 260/37 N
[58] Field of Search ................. 106/21, 22, 23; 260/37 N

[56] References Cited

U.S. PATENT DOCUMENTS

| | | | |
|---|---|---|---|
| 3,632,559 | 1/1972 | Matter et al. ............... | 260/78 SC |
| 4,066,585 | 1/1978 | Schepp et al. ............... | 260/37 N |
| 4,108,812 | 8/1978 | Grueninger .................. | 260/24 |

FOREIGN PATENT DOCUMENTS 1410172  8/1972  United Kingdom .
1341058 12/1973  United Kingdom .

*Primary Examiner*—Lorenzo B. Hayes
*Assistant Examiner*—Amelia B. Yarbrough
*Attorney, Agent, or Firm*—Gerald D. Sharkin; Richard E. Vila; Thomas C. Doyle

[57] ABSTRACT

Disclosed are aqueous printing inks comprising an anionic dyestuff, a pigment or mixtures thereof and a cationic fixing agent based on a water soluble, high molecular weight, cross-linked polyether amine, and the use thereof for printing cellulosic non-woven fabrics, particularly for flexographic printing of tissue papers.

19 Claims, No Drawings

PRINTING INKS CONTAINING A POLYETHER AMINE FIXING AGENT

The present invention relates to stable, aqueous printing inks for printing cellulosic non-woven fabrics and papers, particularly tissue paper.

Printing inks containing an anionic dyestuff and a cationic fixing agent such as a polyamide amine or a polyolefine imine are known. However, the printings obtained with such inks on non-woven fabrics and particularly on tissue paper do not exhibit statisfactory fastnesses towards a large number of agents e.g. alcohol, milk, alkali, acid, solvents, detergents, etc., so that the printed non-woven fabrics may not be used for e.g. various domestic tasks without bleeding. When the cationic fixing agent is a polyamide amine, the printing inks must also contain a volatile amine or ammonia to inhibit premature reaction between the cationic fixing agent and anionic dyestuff. This confers an unpleasant odour to the printed non-woven fabric, particularly when this is immediately rolled up after the printing in a continuous production process. Furthermore, these inks often contain further additives such as a binding agent, e.g. a saponifiable colophony derivative or a saponifiable maleic resin, and their pH exceeds 9 to improve their stability in storage so that they are not compatible with most pigments.

It has now been found that by using a cationic fixing agent based on a polyether amine, homogeneous printing inks optionally containing pigments are obtained which do not have the above disadvantages, particularly the nuisance due to volatile amine, and which give printings on non-woven fabrics with improved fastnesses.

According to the invention, there is provided an aqueous printing ink comprising a colouring material selected from an anionic dyestuff, a pigment or mixtures thereof and a cationic fixing agent based on a water soluble, high molecular weight, cross-linked polyether amine.

The polyether amines present as cationic fixing agent in the printing inks of the present invention, are known and disclosed in U.K. Pat. No. 1,341,058 and its equivalent U.S. Pat. No. 3,753,931. They are produced by reacting an excess of an aliphatic polyamine which contains at least one primary or at least two secondary amino groups, which may bear one or more hydroxyl groups and which has a molecular weight not greater than 200, with a polyepihalogenohydrin which contains 3 to 25 halogenomethyl groups, followed by removal of the excess polyamine from the reaction mixture by distillation, reaction of the resulting polyetheramine in aqueous solution with a crosslinking agent to a degree at which a viscosity increase occurs while the reaction mixture remains water soluble, and partial or complete conversion of any free amino groups present into the corresponding salt form by the addition of an acid.

Preferred polyether amines are those obtained by reacting as stated above an excess of ethylenediamine with polyepichlorohydrin, followed by reaction of the resulting polyether amine with a cross-linking agent of formula

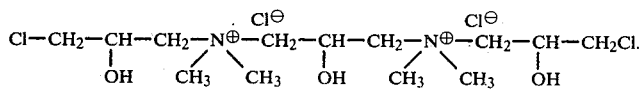

The polyether amine is present in the ink composition in an amount from 2 to 20%, preferably from 5 to 15%, more preferably from 10 to 14% by weight (based on the weight of the printing ink).

The anionic dyestuffs are those which may react with the cationic radicals of the polyether amine on the non-woven fabrics so as to form heteropolar bonds. Suitable anionic dyestuffs are those containing essentially sulpho and/or carboxylic acid groups. They belong, for example, to the so-called acid, direct, indigosol, reactive, metal-complex or metallisable dyestuff classes. They are described in the "Colour Index" under the headings "Acid Dyes", "Direct Dyes", "Reactive Dyes", "Mordant Dyes" and "Solubilized Vat Dyes", the reactive, acid, direct and indigosol dyestuffs being preferred for inclusion in the ink compositions of the invention.

Suitable pigments which may be included in the printing inks, optionally in conjunction with one or more anionic dyestuffs, are those described in the "Colour Index" under the description "Pigment" and which are dispersable in water.

The amount of colouring material present in the ink will depend on the depth of shade required in the final print and on the type of dyestuff used. Generally, when only anionic dyestuffs are present in the ink, the weight ratio of the anionic dyestuffs to the cationic polyether amine is from 1:15 to 5:1, preferably from 1:7.5 to 2:1. When the printing ink contains a pigment alone, the weight ratio of the pigment to the polyether amine is generally from 1:12 to 5:1, preferably from 15:12 to 5:1. When a mixture of pigment and anionic dyestuff is present in the ink, the weight ratio of the whole dyestuff (anionic dye+pigment) to the polyether amine is generally from 1:9 to 5:1, the weight ratio of the pigment to the anionic dyestuff varying in this range in wide limits.

The amount of water in the ink composition depends on the desired viscosity. The printing ink may be prepared in a concentrated form which, if necessary, may be further diluted with water. The total amount of water may be up to 80% by weight. Preferably, the printing inks contain water in an amount from 30 to 60% by weight, more preferably from 40 to 50%. The pH of the inks is from 6 to 11, preferably from 7 to 9.

In addition to the colouring material and the cationic fixing agent, the inks provided by the invention may contain an organic solvent miscible with water. Such solvents are conventional in the flexo-printing art and may be e.g. a glycol or a glycol ether, preferably ethylene glycol. The amount of glycol or glycol ether present in the ink compositions may be up to 30%, preferably from 15 to 25% by weight (based on the weight of the printing ink).

When a pigment is used for the ink, it is convenient to add a dispersing agent selected from a cationic, anionic and non-ionic dispersing agent or a mixture thereof, preferably a mixture of a cationic, anionic and non-ionic dispersing agent. Such dispersing agent is often present in the commercially available pigment.

The viscosity of the inks according to the invention is such as to give an outflow time of 5 to 40 seconds, preferably of 10 to 30 seconds in a DIN beaker 4.

The printing inks according to the invention may be prepared by thoroughly mixing together the constituent ingredients in a determined order. Dyestuffs in powder form are first dissolved in water (in the case of an anionic dyestuff) or mixed into a paste with water (in the case of a pigment); in the latter case, the dispersing agent is added to the pigment paste if such is not present in the commercially available pigment. The same applies for the commercially available pigment paste forms. Subsequently, a glycol or glycol ether, e.g. ethylene glycol, is optionally added to the solution or paste. In the case of dyestuffs in the form of a liquid preparation, the glycol may be added without any previous dilution of the liquid preparation with water. The resulting pre-mixture of colouring material/water/glycol is then stirred into an aqueous solution of the cationic fixing agent. When the colouring material is a pigment, the addition can be reversed, i.e. the cationic fixing agent may be added to the pre-mixture. Where required, the resulting printing inks may be further diluted with water to obtain the desired viscosity.

The printing inks provided by the invention are particularly suitable for use in the flexo-printing process. Of particular interest is their use in printing cellulosic non-woven fabrics, preferably tissue paper, by flexo-printing methods. Printing with these inks may be carried out at room temperature. Fixation of the printings occurs at room temperature after a period of about 72 hours. The fixation process may be accelerated in known manner, e.g. by heat.

The printing inks provided by the invention are homogeneous and stable on storage. They are easily prepared; the basic recipe is the same for all mentioned anionic dyestuffs (dye, water, polyether amine and optionally an organic solvent) and it is not necessary to add further additives. Printings with improved fastnesses, e.g. to water, alcohol, acid and hard soap, are obtained on the non-woven fabrics; the ink compositions containing a pigment give printings with particularly good fastnesses.

The following Examples serve to further illustrate the invention. In the Examples, the percentages and parts are by weight and the temperatures are in degrees Centigrades.

EXAMPLE 1

25 parts of ethylene glycol are mixed with 16 parts of the dyestuff C.I. Direct RED 239 1:9 (liquid) and then slowly stirred into 50 parts of a 26% polyether amine solution according to Example 1 of U.K. Pat. No. 1,341,058 until homogeneous. The resulting composition is further diluted with 9 parts of water.

The mixture obtained is stable on storage and gives dyeings by flexo-print on tissue paper, which have excellent bleeding resistance to water, alcohol, acid and hard soap.

EXAMPLE 2

40 parts of the dyestuff C.I. Pigment Orange 56 containing 5 parts of a commercially available dispersing agent are mixed with 20 parts of water. This mixture is subsequently stirred into 40 parts of a 26% polyether amine solution according to Example 1 of U.K. Pat. No. 1,341,058 until homogeneous.

A printing ink composition which is stable on storage and which has the properties described in Example 1 is obtained. The printings obtained with this ink are also fast to milk, soft soap, diluted caustic soda, salad oil and product for cleaning windows.

Example 3

10 parts of the dyestuff C.I. Direct Blue 261 1:9 (liquid) are stirred into 15 parts of ethylene glycol. 15 parts of the dyestuff C.I. Pigment Blue 15 are then added to this mixture under stirring and the whole mixture is stirred into 50 parts of a 26% polyether amine solution as in Example 1 until homogeneous. The mixture is further diluted with 10 parts of water.

A printing ink composition which is stable on storage and which has the properties described in Example 1 is obtained.

EXAMPLE 4

4 parts of the dyestuff C.I. Reactive Blue 103 are dissolved in 16 parts of water and 25 parts of ethylene glycol and then stirred into 50 parts of a 26% polyether amine solution as in Example 1 until homogeneous. Further dilution takes place with 5 parts of water.

The obtained mixture exhibits an excellent stability on storage.

What we claim is:

1. An aqueous printing ink comprising a colouring material selected from an anionic dyestuff, a pigment or mixtures thereof and a cationic fixing agent based on a water soluble, high molecular weight, cross-linked polyether amine.

2. An aqueous printing ink according to claim 1, wherein the polyether amine is produced by reacting an excess of an aliphatic polyamine which contains at least one primary or at least two secondary amino groups, which may bear one or more hydroxyl groups and which has a molecular weight not greater than 200, with a polyepihalogenohydrin which contains 3 to 25 halogenomethyl groups, followed by removal of the excess polyamine from the reaction mixture by distillation, reaction of the resulting polyether amine in aqueous solution with a crosslinking agent to a degree at which a viscosity increase occurs while the reaction mixture remains water soluble, and partial or complete conversion of any free amino groups present into the corresponding salt form by the addition of an acid.

3. An aqueous printing ink according to claim 1, wherein the polyether amine is present in the ink in an amount from 2 to 20% by weight.

4. An aqueous printing ink according to claim 1, wherein the weight ratio of the anionic dyestuff to the polyether amine is from 1:15 to 5:1 when the colouring material is an anionic dyestuff.

5. An aqueous printing ink according to claim 1, wherein the weight ratio of the pigment to the polyether amine is from 1:12 to 5:1 when the colouring material is a pigment.

6. An aqueous printing ink according to claim 1, wherein the weight ratio of the mixture of pigment and anionic dyestuff to the polyether amine is from 1:9 to 5:1 when the colouring material is a mixture of pigment and anionic dyestuff.

7. An aqueous printing ink according to claim 1, wherein the pH is from 6 to 11.

8. An aqueous printing ink according to claim 1, containing additionally an organic solvent miscible with water.

9. An aqueous printing ink according to claim 8, wherein ethylene glycol is present in an amount up to 30% by weight.

10. An aqueous printing ink according to claim 1, having a viscosity such as to give an outflow time of 5 to 40 seconds in a DIN beaker 4.

11. An aqueous printing ink according to claim 2 wherein the aliphatic polyamine is ethylene diamine, the polyepihalogenohydrin is polyepichlorohydrin and the crosslinking agent is a compound of the formula

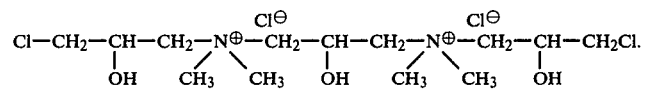

12. An aqueous printing ink according to claim 2 in which the polyether amine is present in an amount of 2 to 20% by weight.

13. An aqueous printing ink according to claim 11 in which the polyether amine is present in an amount of 2 to 20% by weight.

14. An aqueous printing ink according to claim 12 wherein the weight ratio of coloring material to polyether amine is from 1:15 to 5:1 when the coloring material is an anionic dyestuff, from 1:12 to 5:1 when the coloring material is a pigment, and from 1:9 to 5:1 when the coloring material is a mixture of a pigment and anionic dyestuff.

15. An aqueous printing ink according to claim 13 wherein the weight ratio of coloring material to polyether amine is from 1:15 to 5:1 when the coloring material is an anionic dyestuff, from 1:12 to 5:1 when the coloring material is a pigment, and from 1:9 to 5:1 when the coloring material is a mixture of a pigment and anionic dyestuff.

16. An aqueous printing ink according to claim 14 wherein the pH is from 6 to 11.

17. An aqueous printing ink according to claim 15 wherein the pH is from 6 to 11.

18. An aqueous printing ink according to claim 16 wherein the anionic dyestuff is selected from those anionic dyestuffs containing sulpho and/or carboxylic acid groups.

19. An aquous printing ink according to claim 17 wherein the anionic dyestuff is selected from those anionic dyestuffs containing sulpho and/or carboxylic acid groups.

* * * * *